United States Patent
Lepp et al.

(10) Patent No.: US 11,991,537 B2
(45) Date of Patent: May 21, 2024

(54) METHOD AND SYSTEM FOR CLOUD EXTENDED ATTRIBUTE PROFILE

(71) Applicant: BlackBerry Limited, Waterloo (CA)

(72) Inventors: James Randolph Winter Lepp, Ottawa (CA); Dongkai Guo, Kanata (CA); Darren Edward Rogers, Ottawa (CA); Pierre Pierre Blais, Kanata (CA); Michael George Haines, Waterloo (CA)

(73) Assignee: BlackBerry Limited, Waterloo (CA)

( * ) Notice: Subject to any disclaimer, the term of this patent is extended or adjusted under 35 U.S.C. 154(b) by 179 days.

(21) Appl. No.: 17/353,015

(22) Filed: Jun. 21, 2021

(65) Prior Publication Data

US 2022/0408279 A1 Dec. 22, 2022

(51) Int. Cl.
*H04W 24/02* (2009.01)
*H04W 4/80* (2018.01)
*H04W 84/18* (2009.01)
*H04W 88/18* (2009.01)

(52) U.S. Cl.
CPC .............. *H04W 24/02* (2013.01); *H04W 4/80* (2018.02); *H04W 84/18* (2013.01); *H04W 88/184* (2013.01)

(58) Field of Classification Search
CPC ....... H04W 24/02; H04W 4/80; H04W 84/18; H04W 88/184; H04L 67/30; H04L 69/08; H04L 69/22; H04L 67/56
See application file for complete search history.

(56) References Cited

U.S. PATENT DOCUMENTS

| | | | |
|---|---|---|---|
| 7,103,578 B2 | 9/2006 | Beck et al. | |
| 10,230,783 B2 | 3/2019 | Rajan et al. | |
| 10,681,529 B2 | 6/2020 | Khan et al. | |
| 2017/0048656 A1* | 2/2017 | Kwon | H04W 4/80 |
| 2017/0295454 A1* | 10/2017 | Albrecht | H04L 67/02 |
| 2019/0014179 A1 | 1/2019 | Dunsbergen et al. | |
| 2019/0373653 A1* | 12/2019 | Kwon | H04W 12/50 |
| 2020/0002167 A1 | 1/2020 | Naito | |
| 2021/0160213 A1* | 5/2021 | Dees | H04L 67/125 |
| 2021/0409923 A1* | 12/2021 | Kumar | H04L 12/4633 |

FOREIGN PATENT DOCUMENTS

WO 2016/205402 A1 12/2016

OTHER PUBLICATIONS

Extended European Search Report, EP Application No. 22176110, dated Oct. 25, 2022, pp. 1-8.
Bluetooth SIG, Inc, "Specifications List", downloaded from https://www.bluetooth.com/specifications/specs/ on Jun. 21, 2021.

* cited by examiner

*Primary Examiner* — Jae Y Lee
(74) *Attorney, Agent, or Firm* — Moffat & Co

(57) ABSTRACT

A method at a connector device, the method including receiving a first message from a peripheral device, the first message being received over a short range communications protocol connection utilizing a generic reading and writing service attribute profile; repackaging data within the first message into a second message at the connector device; and transmitting the second message to a network element, the transmitting utilizing a second communications connection, wherein the repackaging data populates a field within the second message with information about an attribute profile operation.

14 Claims, 9 Drawing Sheets

US 11,991,537 B2

METHOD AND SYSTEM FOR CLOUD EXTENDED ATTRIBUTE PROFILE

FIELD OF THE DISCLOSURE

The present disclosure relates to peripheral devices, and in particular relates to communications between peripheral devices and network elements.

BACKGROUND

Peripheral devices can be used in a variety of situations. For example, a peripheral device may be a medical device used for providing medical information for a patient. A patient may need to take a device such as a blood pressure monitor, a blood sugar monitor, among others, home, and periodically report readings from such devices. In other cases, a peripheral device may be any other device used to sense data.

In order for peripheral devices to communicate securely with network elements, a connector may in some cases be used for communication between a peripheral device and network elements, where the connector is able to use a first communications technology to communicate with the peripheral devices and a second communications technology to communicate with network elements.

The connector, peripheral device(s) and network elements form a platform, which may be built from a number of pieces designed, developed or operated by different parties. This results in difficulty adding new peripheral devices into the platform as the type and format of data exchanged between peripheral device and the connector, and type and format of data sent to and from the network elements, may differ based on the application. This results in the connector continually needing to be updated to accommodate new types of peripheral devices or new manufacturers of peripheral devices.

BRIEF DESCRIPTION OF THE DRAWINGS

The present disclosure will be better understood with reference to the drawings, in which.

DETAILED DESCRIPTION OF THE DRAWINGS

The present disclosure provides a method at a connector device, the method comprising: receiving a first message from a peripheral device, the first message being received over a short range communications protocol connection utilizing a generic reading and writing service attribute profile; repackaging data within the first message into a second message at the connector device; and transmitting the second message to a network element, the transmitting utilizing a second communications connection, wherein the repackaging data populates a field within the second message with information about an attribute profile operation.

The present disclosure further provides a connector device comprising: a processor; and a communications subsystem, wherein the connector device is configured to: receive a first message from a peripheral device, the first message being received over a short range communications protocol connection utilizing a generic reading and writing service attribute profile; repackage data within the first message into a second message at the connector device; and transmit the second message to a network element, the transmitting utilizing a second communications connection, wherein the repackaging data populates a field within the second message with information about an attribute profile operation.

The present disclosure further provides a computer readable medium for storing instruction code, which, when executed by a processor of a connector device cause the connector device to: receive a first message from a peripheral device, the first message being received over a short range communications protocol connection utilizing a generic reading and writing service attribute profile; repackage data within the first message into a second message at the connector device; and transmit the second message to a network element, the transmitting utilizing a second communications connection, wherein the repackaging data populates a field within the second message with information about an attribute profile operation.

GATT (Generic Attribute Profile) is a high level client-server protocol for use over Bluetooth Low Energy (BLE). It is used for communication between devices in an energy efficient manner. It is used in the present disclosure to illustrate an attribute profile for short range communications, but is merely provided as an example. In some embodiments other attribute profiles and other short range communications than GATT and BLE could be used.

Figure 1:
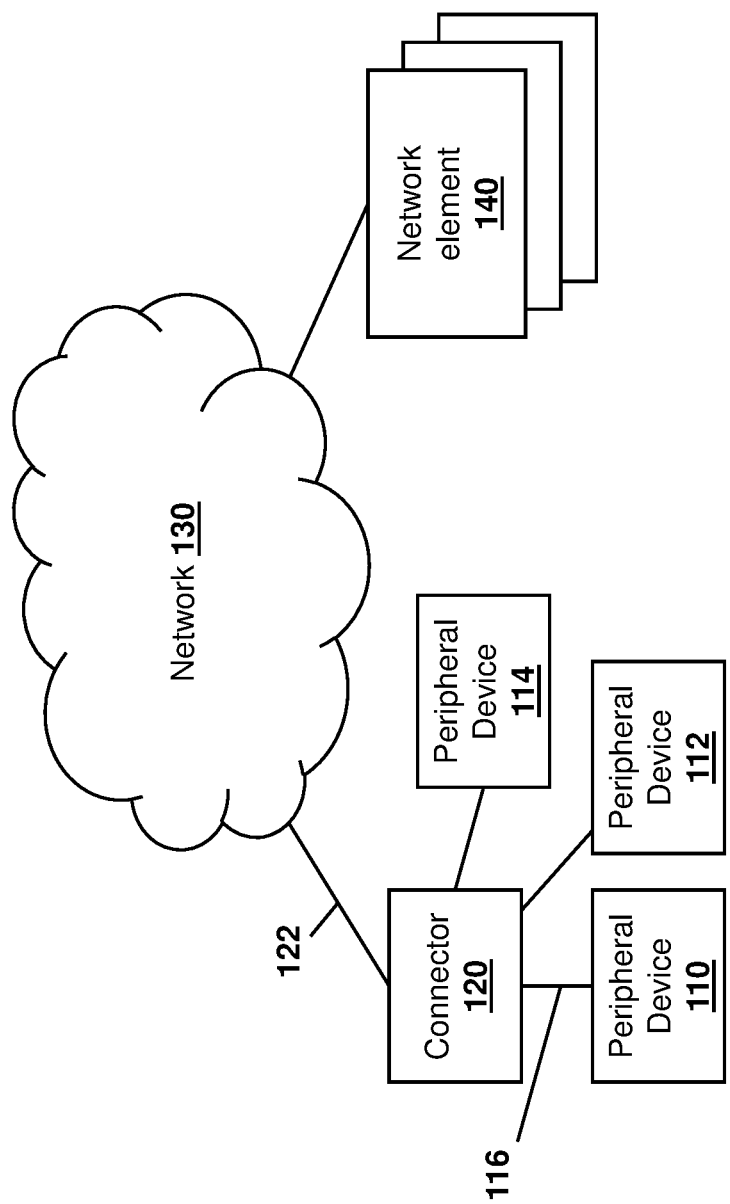
FIG. 1 is a block diagram showing an example platform having peripheral devices communicating through a connector to at least one network element.

For example, reference is now made to FIG. 1, which shows an example architecture which may allow a peripheral device to communicate with a network element.

Specifically, in the embodiment of FIG. 1, a peripheral device 110, a peripheral device 112 and a peripheral device 114 are shown. However, this is merely an example, and in some embodiments, only a single peripheral device may exist. In other embodiments, only two peripheral devices may exist. In other cases, more than three peripheral devices may exist.

Peripheral devices 110, 112, and 114 can be used in a variety of situations. For example, a peripheral device 110 may be a medical device used for providing medical information for a patient. In other cases, a peripheral device 110 may be any other device used to sense data, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Peripheral devices 110, 112 and 114 may communicate over a first communications connection 116 with a connector 120. In the examples presented below, the first communications connection 116 is described as a Bluetooth Low Energy connection. However, this is not limiting and in other cases other types of communications protocols may be used.

Connector 120 is a device capable of communicating with peripheral devices 110, 112 and 114 and further capable of connecting to a network and ultimately to various network elements. In particular, connector 120 utilizes communications connection 122 to communicate through network 130 with one or more network elements 140. In general, connector 120 provides secure connectivity to a server to peripheral devices that would otherwise only have local connectivity.

For example, connector 120 uses a cellular (WAN) or Wi-Fi (WLAN) connection to backhaul data to a server which uses the data to provide a service. The connector 120 is designed to work with a variety of different peripheral devices. It may interface with the device using different wired or wireless protocols, but a commonly used one is Bluetooth, or more specifically Bluetooth LE GATT. BLE GATT uses a client/server model where the peripheral device operates as the GATT server and the connector 120 operates as the GATT client. The GATT protocol, as defined by the Bluetooth Special Interest Group (BT SIG) standards, has several basic operations: discover, read, write, notification, indication.

Communications connection 122 may use any communications protocol capable of communicating between connector 120 and network 130 and may, in some cases, include cellular, satellite, Wi-Fi among other options for communicating. Network 130 maybe a local area network or a wide area network and may include, for example, the Internet, cellular infrastructure networks, or a combination of various networks.

One or more network elements 140 may consume data from peripheral devices 110, 112 or 114 and may provide commands to peripheral devices 110, 112, or 114.

Figure 2:
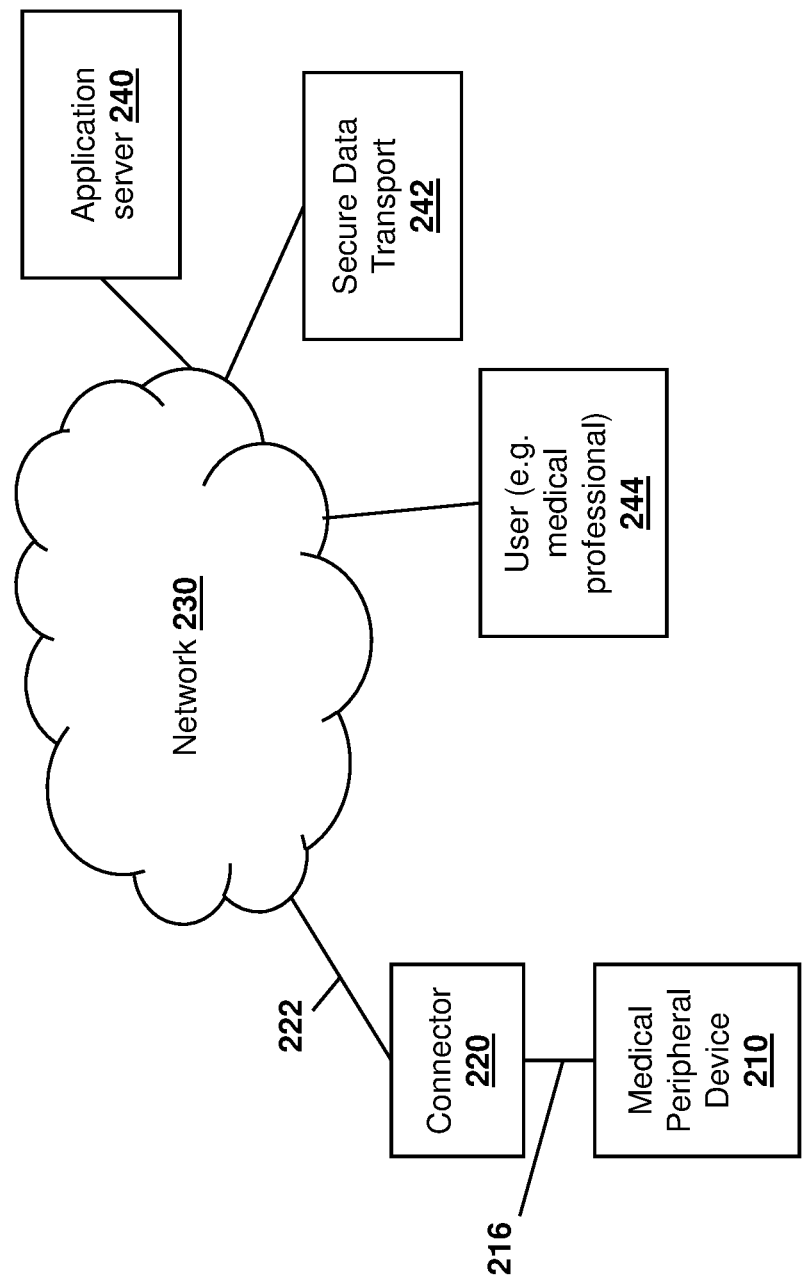
FIG. 2 is a block diagram showing an example platform having a medical peripheral device communicating through a connector to a plurality of network elements.

The environment of FIG. 1 can be used in a variety of situations. One non-limiting example is shown with regards to FIG. 2. In the embodiment of FIG. 2, a medical peripheral device 210 such as a blood pressure monitor, may be deployed to the home of a patient. At the same time, the patient may be provided with a connector 220 which can communicate with medical peripheral device 210 over a Bluetooth low energy connection 216.

In the example of FIG. 2, connector 220 is further configured to communicate with network 230 over a connection 222 such as a cellular connection. For example, in order to ensure that data from patient can always be received, connector 220 may be configured with a cellular SIM card and may be capable of establishing communications with a cellular network to provide data to and from connector 220. However, other options are possible.

In the example of FIG. 2, three network elements are shown. An application server 240 may store data received from connector 220 and may provide commands to connector 220 to forward to medical peripheral device 210. Application server 240 may in some cases communicate with other network elements such as a secure data transport element 242 which may ensure that data passing between the application server and the connector 220 is secure. Further, a network element may include a user device 244 such as a medical professional's computer, where the medical professional is monitoring a patient that was issued medical peripheral device 210. In some cases, all the network elements may communicate directly with connector 220. In other cases, the network elements may communicate with each other and only one or a subset of network elements may communicate with connector 220.

The platforms shown in the embodiments of FIGS. 1 and 2 are built from a number of pieces. In practical situations, such pieces are generally designed, developed or operated by different parties, including different organizations, or different teams within an organization.

A typical deployment involves developing a new Client implementation on the connector 120 for each new type of peripheral device 110 (medical sensor, etc.) that is going to be connected to it. Specifically, many IoT and connected device applications (including medical applications) are data driven and designed to run on a (cloud) server to process data and communicate to users (including medical professionals) to act on the data.

However, every new Client implementation on the connector 120 for each new device involves rewriting and pushing updates to each connector any time a new peripheral device is introduced. What is needed is a mechanism to extend the attribute (for example GATT) commands from the sensor, over a short range communication protocol such as Bluetooth, and back to the cloud or network element where the application logic is running.

For example, medical sensor devices come in all types, such as blood pressure reading, kidney function monitoring, infusion pump control, among others. The connector and Internet of Medical Things (IoMT) platform need to support a variety of existing devices, but also to be future-proof to add new devices with minimal rework. Some devices are common and will be the subject of standard interoperable GATT (or other attribute profile) services, but others are highly specialized or proprietary and the connector device may need to support both. The variety of sensors and applications is even greater in the general IoT connected device space.

For BLE, while the GATT primitives are standardized, the way in which BT SIG defines standard services and characteristics is very application specific. Similar primitives exist for other attribute profiles in various short range communication protocols. As such, the connector may need to be reprogrammed with each new service/characteristic to support further types of peripheral devices. This problem is both a pre-market development activity and also relates to deploying new profiles to devices in-market.

Further, the peripheral devices and connector device may be developed by different organizations. In this regard, it is uncertain who should develop the code specific to a new peripheral device. In some cases, a code update on the medical device may be needed. In some cases, a code update on the connector may be needed. In some cases, a code update on the cloud or at the network servers may be needed. Each is discussed below.

Generic GATT Transfer Service

Bluetooth GATT services are defined for all sorts of device types and are described below as one example of an attribute profile. This includes some common medical devices and non-medical devices such as bicycle accessories.

As indicated above, GATT is a generic attribute profile and defines the way that two Bluetooth Low Energy devices transfer data between themselves. GATT uses concepts referred to as Services and Characteristics as outlined below for such data transfer.

GATT applies after a dedicated connection is established between the peripheral device and connector, and is therefore used for data exchange rather than pairing.

Figure 3:
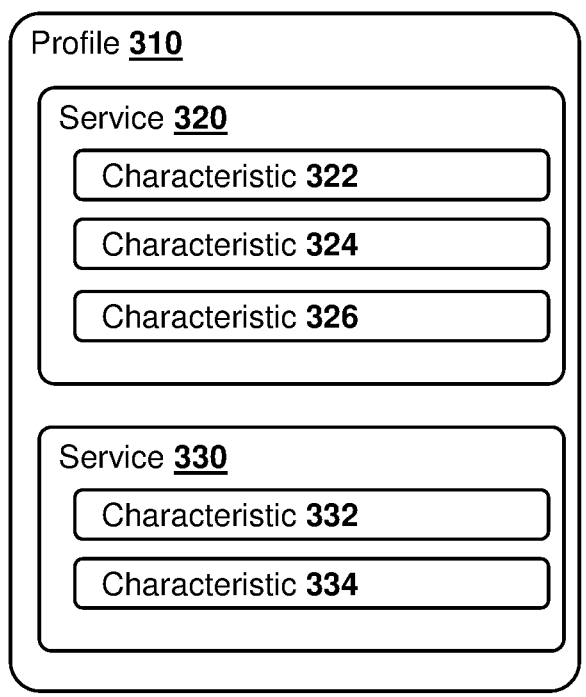
FIG. 3 is a block diagram showing a Generic Attribute Profile (GATT).

Reference is now made to FIG. 3, which shows a block diagram of the concept of a profile, nested services, and nested characteristics.

In particular, a profile 310 provides a defined collection of services that may be compiled by the BT SIG group.

Services are used to combine data into logical entities and in particular to a group of characteristics based on logical functionality. A service can have one or more characteristics, and may have a unique identifier called a universally unique identifier (UUID).

Characteristics encapsulate a single data point or an array of related data. For example, characteristics may provide a data point such as a heart rate measurement characteristic in a particular data format. In some cases, the data may include an array of data such as the three axes from an accelerometer. Other options are possible.

Characteristics may also be used to provide data back to the peripheral device and thus allow for writing to the characteristic.

In the example of FIG. 3 profile 310 includes service 320 and service 330.

Service 320 includes three characteristics, namely characteristic 322, characteristic 324 and characteristic 326.

Service 330 includes characteristics 332 and characteristics 334.

As provided above, each peripheral device may utilize a different GATT profile and depending on the device type, may require certain services to exist within such profile. However, this makes it difficult for a connector to communicate with a variety of peripheral devices.

Utilizing the above structure, in one embodiment a new GATT Service and corresponding Characteristics are defined for a cloud transfer service. This could be defined as a vendor-specific service (proprietary) or defined as a standard within BT SIG. Such GATT Service is a generic data reading and writing service to get information to and from the peripheral device. The generic GATT transfer service can be used locally point to point, or in conjunction with further transfer of data to the cloud (network element) and receipt of commands from the cloud (network element). It is a pipe between the peripheral and connector that takes care of encryption, retransmission, among other such functionality.

From the network elements, control-plane and management-plane commands can control aspects of the reading and writing behavior. Write operations from the network elements are written by the connector to the BLE GATT server. The contents of read operations as well as notifications and indications are received over Bluetooth at the connector and transmitted to the network elements. As used herein, network elements could include cloud services, on-premise servers or another endpoint for the data being transferred.

Therefore, in accordance with one embodiment, the peripheral device implements a generic cloud transfer service instead of any device-specific services.

Further, information about the GATT operation may be embedded in the messaging between the connector and the network element/cloud. For example, if Message Queuing Telemetry Transport (MQTT) is used as the protocol between the connector and the network element/cloud, the "topic" field can be populated with information about the GATT operation. For example, the topic can be populated with a UTF-8 text string that specifies whether the data was received via an indication or a notification, or in response to a read command. Other data transports can also be used for cloud communication.

Figure 4:
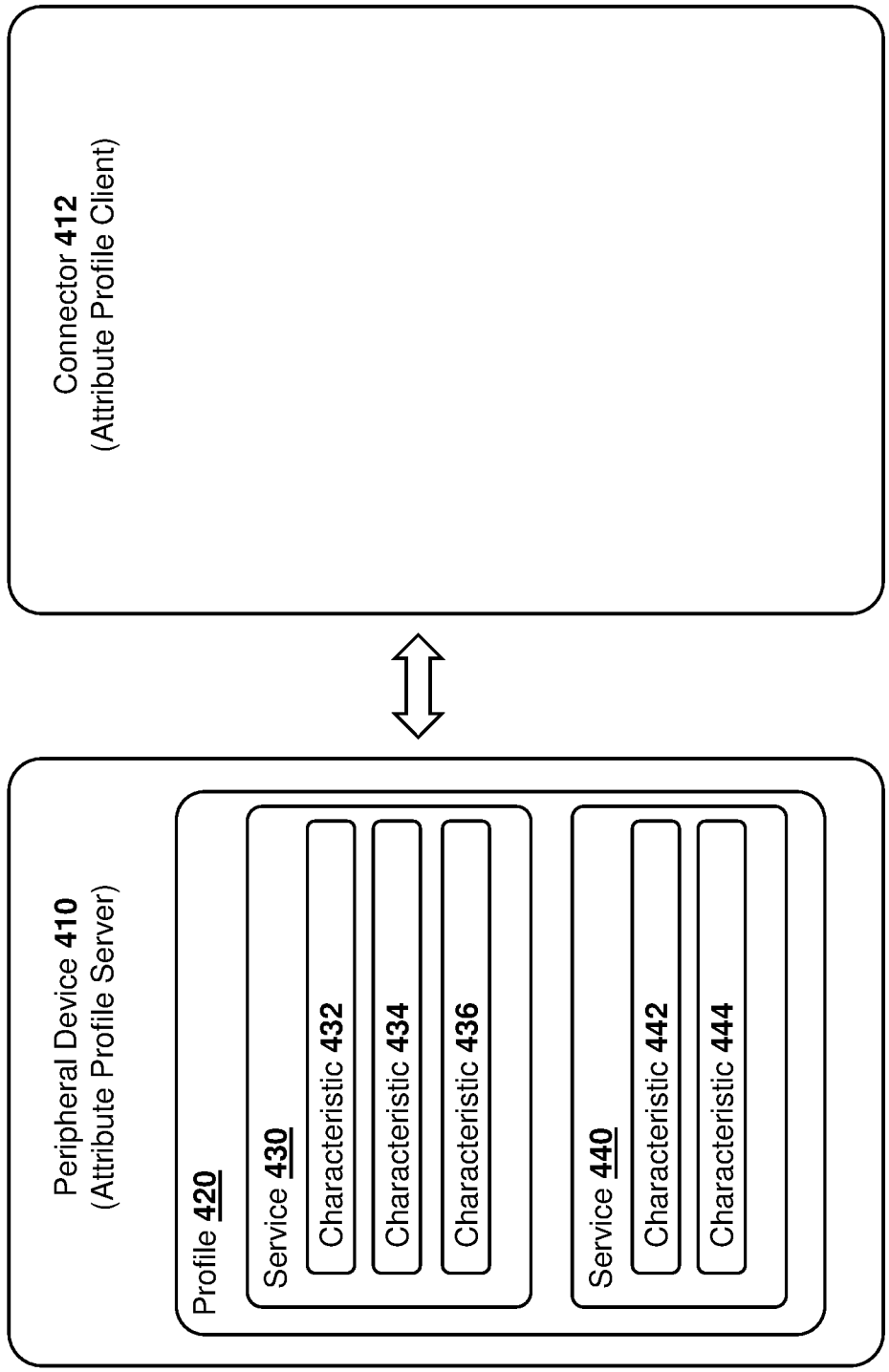
FIG. 4 is a block diagram showing a GATT profile for use in communications between a Bluetooth Low Energy Server and Bluetooth Low Energy Client.

For example, reference is now made to FIG. 4, in which an example GATT Service is provided. Contrary to traditional BLE GATT services, which are designed to make the GATT Server simple and the GATT Client complex, the example of FIG. 4 keeps the GATT Server simple, and makes the GATT Client simple as well, pushing any complex logic to the cloud or other processing server. Such design makes the connector just a pipe to the cloud.

In the embodiment of FIG. 4 a peripheral device 410 includes a profile 420. Various services such as services 430 and 440 may be defined. The services may include characteristics such as characteristics 432, 434 and 436 within service 430. Further, characteristic 442 and characteristic 444 may be part of service 440. Other characteristics may further be part of service 440, and service 440 is therefore not limited to two characteristics. In one embodiment, a service 440 maybe a generic service.

A generic GATT service may require sub-procedures, including those listed in Table 1 below.

TABLE 1

| GATT Sub-Procedures |
|---|
| Indications |
| Read Characteristic |
| Write Characteristic |
| Notification |
| Others - To be determined, for example if discovery and pairing are also needed |

The service may include a UUID which may be 16 or 128 bits for example.

In one embodiment service 440 may have at least four characteristics. Such characteristics may be simplistic characteristics designed to split the control/management/data planes. Example characteristics include a configuration characteristic such as a BTConfiguration characteristic; a CloudDataDownload Characteristic; a CloudDataUpload characteristic; and a DeviceConfig characteristic. Each is described below.

Figure 5:
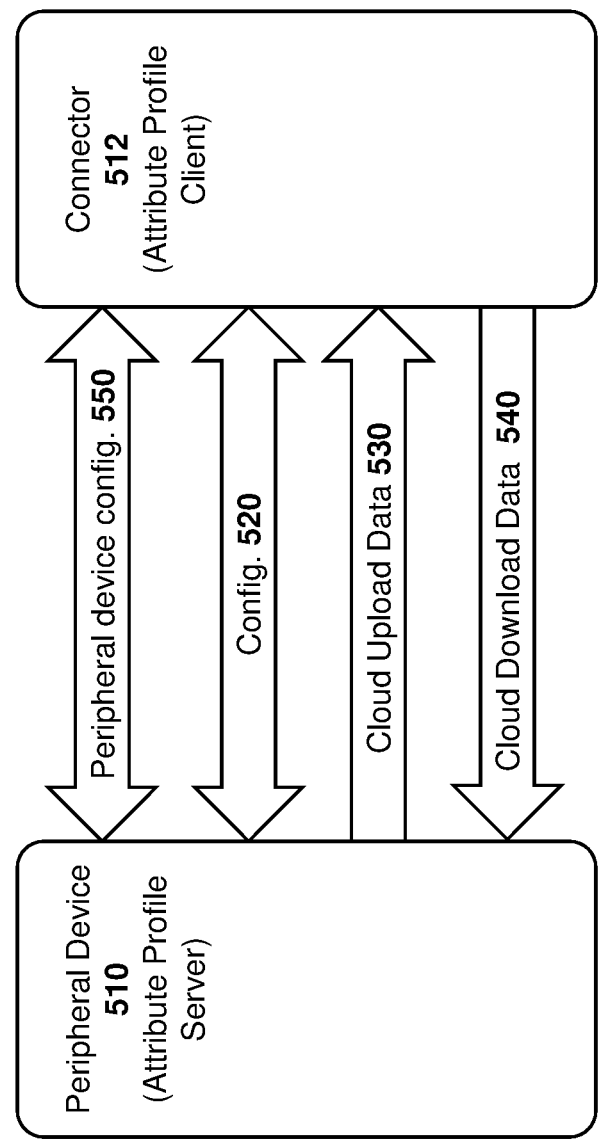
FIG. 5 is a block diagram showing communications between a Bluetooth Low Energy Server and Bluetooth Low Energy Client.

Reference is made to FIG. 5, which shows communication between a peripheral device 510 acting as the short range communications attribute profile server, such as a BLE GATT server, and a connector 512 acting as the short range communications attribute profile client, such as a BLE GATT client.

A Configuration characteristic (such as a BTConfiguration characteristic) is a read and write characteristic used for device configuration with short range communication protocol configuration messages 520 (for example Bluetooth configuration messages). The characteristic may be used to configure the uplink downlink traffic patterns and timing, and whether uplink data is read (polled) by the client, or whether it uses notifications. The configuration should be read to and written from the cloud and the connector merely performs a read/write.

The CloudDataDownload characteristic is a write characteristic where data packets from the cloud/network element are written to the peripheral device over a protocol such as BLE. This is shown with message 530. In one embodiment, the maximum packet length is 509 octets. However, 20 octets fit in one BLE frame so more efficient wireless transmissions may be achieved with small packet length. Packet size negotiation, fragmentation and reassembly may be needed in some embodiments.

The CloudDataUpload characteristic is a read, indicate and notify characteristic. Data packets from the peripheral device are transmitted to the Connector, which in turn transmits them to the cloud/network element. This is shown with message 540 and can be implemented in various ways and is controlled by the Configuration characteristic.

For example, in one embodiment indications can be used to enable the peripheral device to transmit at any time. Under current BLE specifications, indications are at most 20 bytes, so if the upload payload is small such payload can be sent within the indication. If the upload payload is larger, the indication may to indicate a larger payload size, and the client may then need to do a read characteristic operation to retrieve the payload content. In some cases, two different indications may be provided, one for when the payload fits in the indication and one where it does not. In some cases, one indication with a flag specified in the payload could be used.

In one implementation, read operations are used for the Connector to poll the peripheral device for data.

The DeviceConfig characteristic is a read and write characteristic, and represents a payload that is transferred back and forth to the cloud/network element over a secure protocol. Examples of such secure protocol may include Transport Layer Security (TLS), Message Queuing Telemetry Transport (MQTT), among others. The DeviceConfig characteristic is part of a pipe concept, where the configuration is set at the cloud and written to the device by the connector. Further, configuration can be read by the connector and reported back to the cloud/network element. This is shown with message 550.

Figure 6:
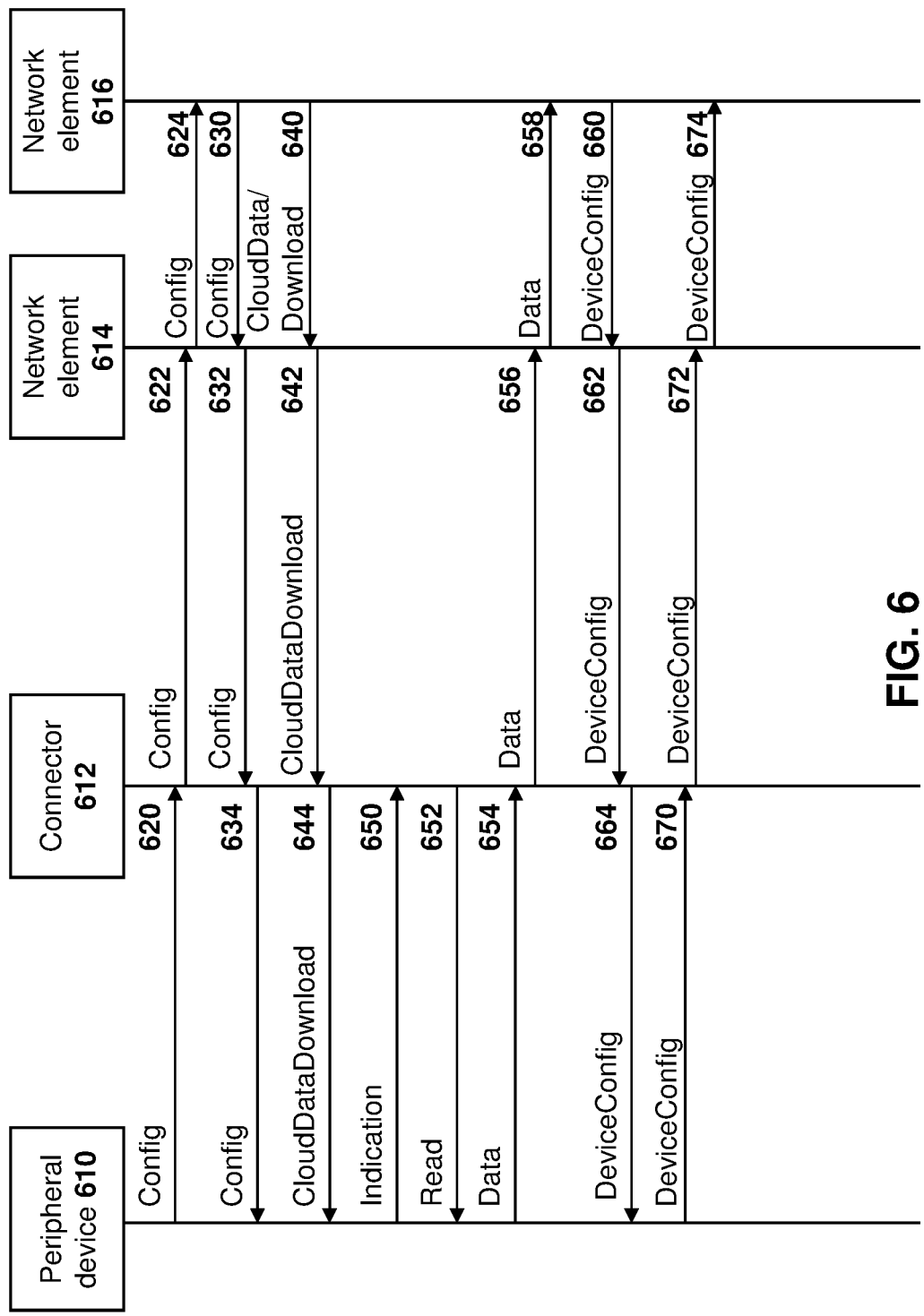
FIG. 6 is a dataflow diagram showing communications between a peripheral device and a network element with a connector and second network element in the communications path.

The above illustrates a pipe concept, in which the connector is merely a conduit for information. Specifically, reference is now made to FIG. 6. In the embodiment of FIG. 6, a peripheral device 610 may be a medical device and a network element 616 may be a medical services provider with a cloud service. In this case, a connector 612 and a network element 614, which may be a generic cloud service, exist between peripheral 610 and network element 616.

While the embodiment of FIG. 6 shows messaging flows through network element 614, in some cases it may flow directly from connector 612 to network element 616. In other cases, more network elements may be in the path, and the present disclosure is not limited by the number of network elements.

The various characteristics may be used to get data from and provide data to the peripheral device 610. The order of the messages in the embodiment of FIG. 6 is merely provided as an example.

For example, in the embodiment of FIG. 6, a configuration message 620 is provided from peripheral device 610 to connector 612. For example, message 620 may be a Bluetooth configuration message. Connector 612 may receive message 620, in some cases repackage it for the network elements, and provide the message as message 622 to network element 614. For example, the repackaging may insert information about the attribute profile operation into specified fields in message 622.

Network element 614 may then forward the message as message 624 to network element 616. Network element 616 may have the logic to determine how the device should be configured and in this case, the network element 616 may provide for reconfiguration of the peripheral device 610 utilizing a configuration message 630, which is sent to network element 614. The configuration message is sent as message 632 to connector 612.

Connector 612 may then receive the message, repackage it as necessary, and provide it to the peripheral device 610 as message 634. This may be done using the generic attribute profile format. For example, data in a specified field in message 632 may provide information about the attribute profile operation to allow message 634 to be created.

When network element 616 has data for the peripheral device 610, this may be provided as a cloud data download, shown with message 640 which is sent to network element 614. The cloud data download is then sent as message 642 to connector 612. Connector 612 then may repackage the data and provide it in the generic attribute profile format to peripheral device 610 using message 644.

When peripheral device 610 has data that needs to be provided to network element 616, the peripheral device 610 may provide an indication as shown with message 650 to connector 612. In this case, the indication is that the data does not fit in the indication message and therefore connector 612 may do a read operation as shown with message 652. The data is then provided in message 654 utilizing the generic attribute profile format.

Connector 612 may repackage the data as necessary, and provide the data to network element 614 as message 656.

Network element 614 may then provide the data to network element 616 as shown with message 658.

Similarly, if the network element 616 needs to reconfigure the peripheral device 610, this may be done with the device configuration message 660, which is provided to network element 614. Network element 614 passes the device configuration in message 662 to the connector 612.

The connector 612 may receive message 662, repackage the message as necessary into a generic attribute profile format and provided the generic attribute profile formatted message to the peripheral device 610 as message 664.

In some cases, device configuration information may be provided from the peripheral device 610 to network element 616. This may be done by packaging the device configuration in a generic attribute profile format utilizing message 670 to connector 612. The connector 612 may then repackage the message and send it to the network element 614 as message 672.

The device configuration message may then be provided from network element 614 to network element 616 utilizing device configuration message 674.

In this way, the connector acts as a conduit for messaging for which the logic exists within a network element 616.

GATT Service Plugins

In accordance with another embodiment of the present disclosure, plugins for a connector are written and can be installed from the cloud/network element to run on the connector. For example, such plugins can be over-the-air (OTA) provisioned.

Device Management software in the cloud or on a network element is able to provision these plugins to the connector based on what peripheral devices will be used with it. The device manager can change the installed attribute profile service plugins as needed over the operational lifecycle of the peripheral device.

By using this plugin model, a connector can be configured as necessary. Specifically, supporting the set of all possible short range communication attribute profile services (for example BLE GATT Services) used by peripheral devices that can be associated with a connector would require implementing a monolithic library on the connector that would grow with each possible new peripheral device being added to the set of peripheral devices that can be associated with a connector.

Instead, the present embodiment supports a "plugin" approach whereby support for each possible short range communication attribute profile Service is coded into a "plugin" that can be dynamically downloaded and provisioned on a connector, based on what peripheral device(s) the specific connector instance is expected to be associated with.

In one embodiment the plugins could use a pseudo-programming language to describe the service behavior.

Figure 7:
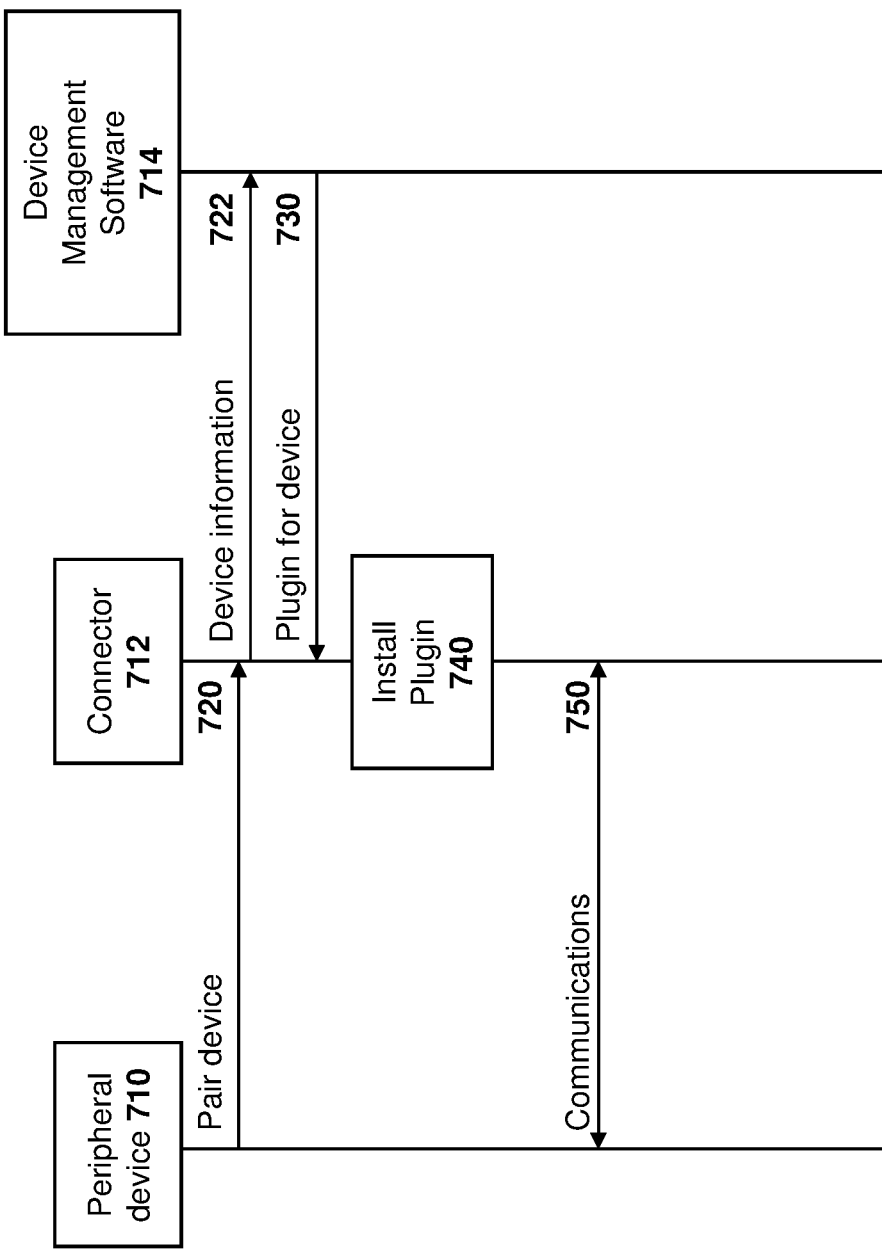
FIG. 7 is a dataflow diagram showing a device management server providing plugins to a connector for communications with a peripheral device.

Reference is now made to FIG. 7. In the embodiment of FIG. 7 a peripheral device 710 communicates with a connector 712. Further, device management software 714 may exist in a network or the cloud.

In one example, peripheral device 710 is a new device that pairs with connector 712, as shown with message 720. However, this is merely one example, and in other cases, connector 712 may be configured prior to any peripheral devices connecting to such connector based on the anticipated usage for the connector.

In accordance with the embodiment of FIG. 7, connector 712 does not recognize the type of peripheral device and therefore provides device information in message 722 to device management software 714.

In one embodiment, device management software 714 may have a database of plugins for various peripheral devices and may find the appropriate plugin for peripheral device 710. Such plugin may be provided in message 730 back to connector 712.

When receiving message 730, connector 712 may install the plugin as shown at block 740. The installation of the plugin at block 740 will allow the connector 712 to receive and interpret data from the peripheral device 710 and to format data for the peripheral device 710 in the appropriate format for communications based on the specific attribute profile for the peripheral device.

Subsequently, communications utilizing the attribute profile for the peripheral device may occur, as shown with arrow 750. Such communications may then be provided to or from a cloud service.

In other embodiments, when a connector is being deployed, for example when it is being issued to a patient in a medical scenario, the connector may be configured with plugins for the anticipated usage of the connector. In some cases, the anticipated usage can be specified based on a selection in a configuration program, based on an identification code provided to the device management software, or other identifying information that would allow device management software 714 to determine the configuration and therefore the necessary plugins for the connector 712.

The embodiment of FIG. 7 allows for flexibility to work with existing peripheral devices that already have an attribute profile service implemented, but still requires custom code to be developed per attribute profile service on the connector device management system. In some cases, the embodiment of FIG. 7 can be used when a device is been designed and has already implemented a attribute profile service. In this case, the burden is on a connector provider to develop the attribute profile client plugins.

GATT Proxy Service

In accordance with a further embodiment, a protocol may be provided between the connector device and the cloud/network element to drive the behavior of the Attribute Profile Client (for example a GATT Client) running on the connector device remotely from the cloud/network element.

In particular, the peripheral device is designed as usual, implementing any attribute profile services and attribute profile characteristics and operating as an Attribute Profile Server. The connector acts as an attribute profile client, but the behavior of its short range communications attribute profile stack (for example a BLE GATT stack) is not programmed and run locally.

Specifically, all attribute profile client operations are driven remotely via a proxy service. This allows new attribute profile client profiles to be dynamically driven from the cloud or network element.

No updates are required to the connector's programming logic, only changes on the cloud or network element are required when implementing support for new attribute profile services or changing the behavior of current attribute profile services.

In this solution, the proxy instructions come from the cloud/network and cause an application on the connector to effect all the short range communications attribute profile service functions, such as BLE GATT service functions, through the short range communications protocol stack.

In one embodiment, the protocol is designed using JavaScript Object Notation (JSON) syntax placed into MQTT frames, but different syntax or protocols could be used.

Instructions are encoded into JSON strings specifying what action to take (e.g., read, write) on what service or characteristic (for example based on BLE UUIDs). Responses and data coming from the peripheral are also encoded into JSON strings, reflecting type (e.g., response to a read instruction, notification such as a BLE notification, indication such as a BLE indication, error response, etc.) and provenance (which characteristic, based on UUID, carried the notification or indication).

Other mechanisms than JSON strings, including but not limited to eXtensible Markup Language (XML), binary, among others, could be supported as the format itself may be inconsequential, and only the instructions and responses may be relevant.

Figure 8:
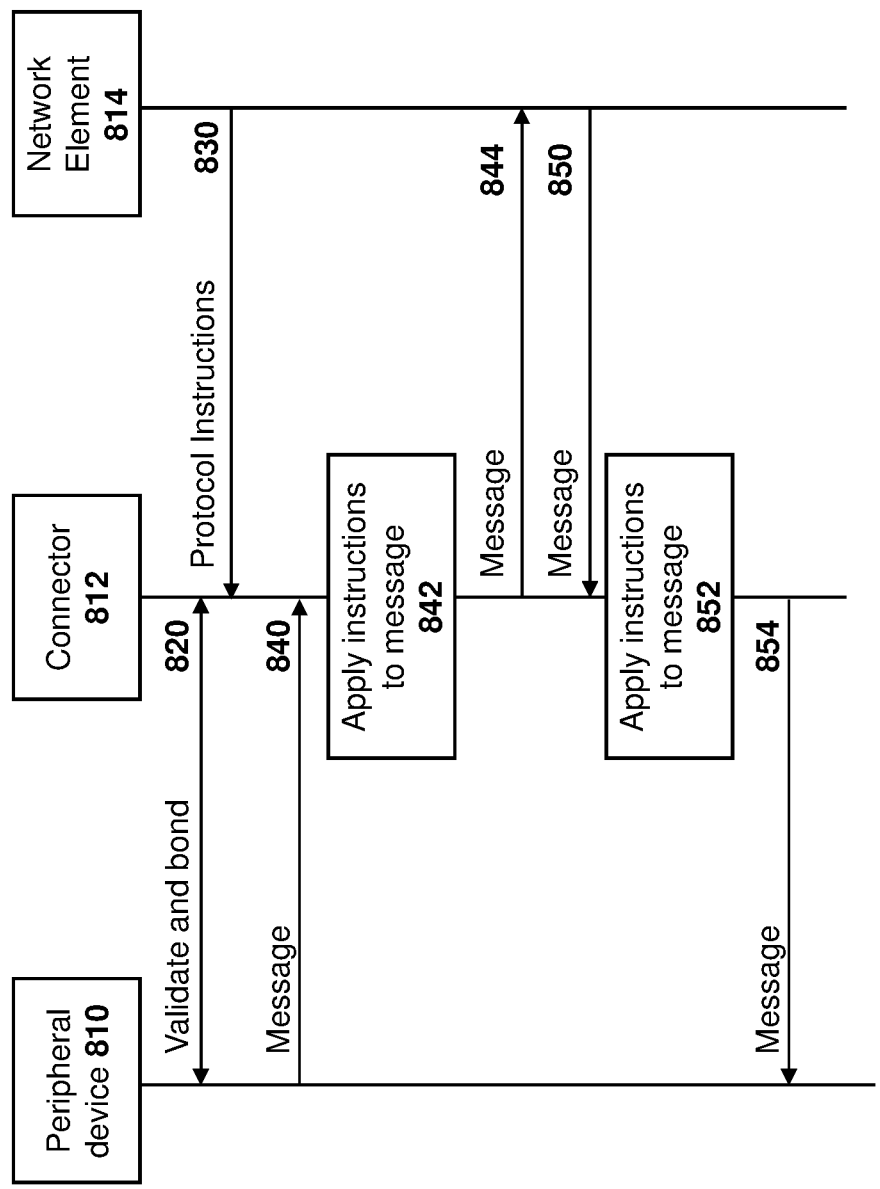
FIG. 8 is a dataflow diagram showing communications between a network element and a peripheral device through a connector in which protocol instructions are forwarded from the network element to the connector.

For example, reference is now made to FIG. 8. In the embodiment of FIG. 8 a peripheral device 810 communicates through a connector 812 with a network element 814. The peripheral device has been validated and is bonded to the connector, as shown with arrow 820.

Thereafter, the interface between a client and a server involves reading from and writing to characteristics. In the embodiment of FIG. 8 a client that is a proxy to a remote client is created, where reading and writing these characteristics can be done through instructions sent to the client using a protocol that describes what should be done.

One example Application Program Interface (API) for this is provided below. Instructions are encoded in JSON strings, received as MQTT payloads and decoded by an application at the connector 812. The instructions cover typical types of actions that are required to interact with a short range communications protocol service.

TABLE 2

Example JSON Tags and Descriptions

| JSON Tag | Definition |
|---|---|
| seq | a sequence number (starting at 0 for each new connection) that can be used to drop duplicated JSON strings received over MQTT, and to ensure no instructions are lost |
| typ | G - GATT |
| cid | correlation ID - a unique ID in any format, optionally to be used in the response |
| err | For error reporting |
| cmd | D - discover |
| | R - read |
| | W - write |
| | C - connect |
| | I - Indication |
| | N - Notification |
| svc | UUID of the service |
| | all - for discovery of all services |
| chr | UUID of characteristic |
| | List of UUIDs of characteristics |
| | all - for discovery of all characteristics |
| dsc | UUID of descriptor |
| | all - for discovery of all characteristics |
| val | A value to be written |

As seen in Table 2, various JSON tags may be used as part of instructions on how to handle messages. These instructions are sent as message 830 to connector 812 so that a connector application can properly handle messages to and from peripheral device 810.

For example, peripheral device 810 may send a message 840. The connector application at connector 812 may then apply the protocol instructions at block 842. The message may then be forwarded as message 844 to network element 814.

Similarly, network element 814 may send message 850 to connector 812. The connector 812 may then apply the protocol instructions to the message, as shown at block 852. The converted message may then be provided to the peripheral device 810 as message 854.

Possible values in the instructions of message 830 may include:

TABLE 3

Example Values

| Value | Description |
|---|---|
| s-UUID | a service UUID |
| c-UUID | a characteristic UUID |
| d-UUID | A descriptor UUID |
| xxx | A value to be written. This might take the form of a type-value tuple in some embodiments |
| n | A unique sequence number starting at 0 for a new connection, that increases monotonically by one for each JSON string sent or received over an MQTT connection. JSON strings with duplicated sequence numbers are discarded silently. Missing sequence numbers are reported, the connection is restarted, and the connection to the peripheral device is also restarted. |

Using the tags from Table 2 and values from Table 3, commands may be sent to the connector. Example commands are shown in Table 4.

TABLE 4

Example Commands

| Command | Example |
|---|---|
| Discover all primary services | {seq: n, typ: "G", cmd: "D", svc: "all"} |
| Discover primary services by service UUID | {seq: n, typ: "G", cmd: "D", svc: "s-UUID"} |
| Discover all characteristics of a service | {seq: n, typ: "G", cmd: "D", svc: "s-UUID", chr: "all"} |
| Discover characteristics by UUID | {seq: n, typ: "G", cmd: "D", svc: "s-UUID", chr: "c-UUID"} |
| Discover all characteristic descriptors | {seq: n, typ: "G", cmd: "D", svc: "s-UUID", chr: "c-UUID", dsc: "all"} |
| Read characteristic descriptor | {seq: n, typ: "G", cmd: "R", svc: "s-UUID", chr: "c-UUID", dsc: "d-UUID"} |
| Write characteristic descriptor | {seq: n, typ: "G", cmd: "W", svc: "s-UUID", chr: "c-UUID", dsc: "d-UUID", val: xxx} |

The examples of Table 4 are non-limiting examples of some short range communication protocol functionality (such as BLE functionality) that may be used by a connector application to apply to messages.

The embodiment of FIG. 8 provides flexibility to work with existing peripheral devices that already have an attribute profile service implemented, but there is still custom code to be developed per attribute profile service on the cloud/network. Thus the embodiment of FIG. 8 could be used where the peripheral device has already been designed and implemented a attribute profile service and the burden is on the Cloud Application provider to develop the cloud application code corresponding to the peripheral device.

Based on the above, various options for communications between a peripheral device and a connector are provided, where the connector is used to allow for communication between the peripheral device and a network element. This allows for peripheral devices to change or to be added over time, and avoids having software on the connector rewritten or updated each time a new type of peripheral a device is utilized with such connector.

The above connectors, peripheral devices, network elements, and other computing platforms may be implemented using any computing device. One simplified diagram of a computing device is shown with regard to FIG. 9. The computing device of FIG. 9 could be any fixed or mobile computing device.

Figure 9:
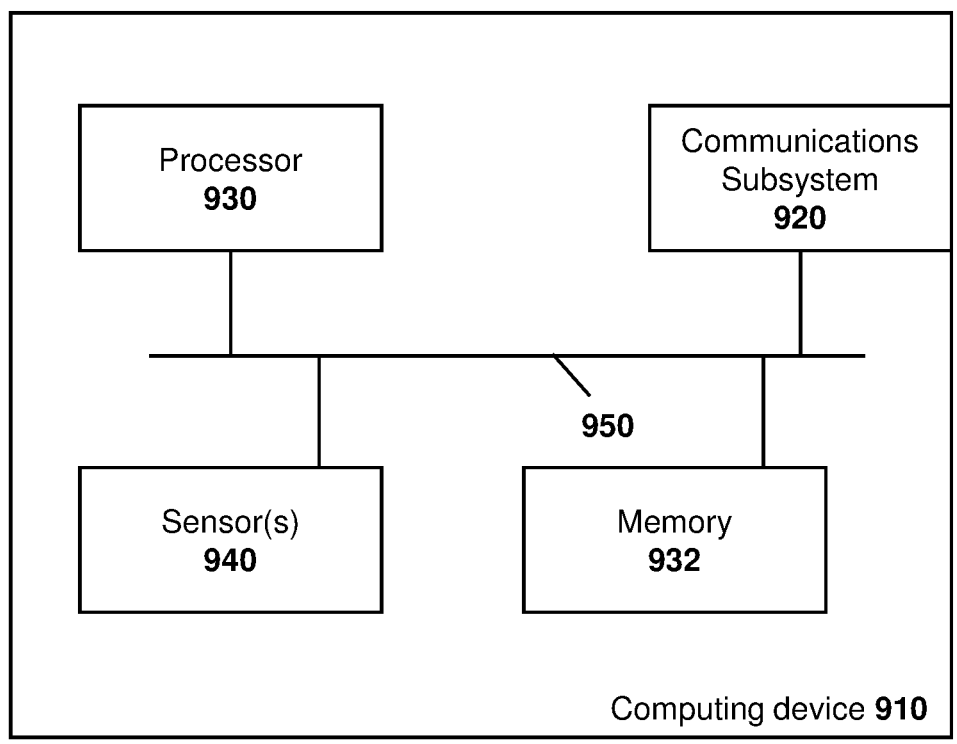
FIG. 9 is a block diagram of a simplified computing device capable of being used with the embodiments of the present disclosure.

In FIG. 9, device 910 includes a processor 920 and a communications subsystem 930, where the processor 920 and communications subsystem 930 cooperate to perform the methods of the embodiments described above. Communications subsystem 930 allows device 910 to communicate with other devices or network elements and may vary based on the type of communication being performed. For example, if device 910 is a peripheral device, communications subsystem may comprise a BLE communications subsystem or other short range communications subsystem. Further, communications subsystem 930 may comprise a plurality of communications technologies, including any wired or wireless communications technology. For example, if device 910 is a connector, communications subsystem 930 may include both a BLE communications subsystem as well as a wide area network communications subsystems such as a cellular communications subsystem or a Wi-Fi communications subsystem, among other options.

Processor 920 is configured to execute programmable logic, which may be stored, along with data, on device 910, and shown in the example of FIG. 9 as memory 932. Memory 932 can be any tangible, non-transitory computer readable storage medium which stores instruction code that, when executed by processor 920 cause device 910 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 932, device 910 may access data or programmable logic from an external storage medium, for example through communications subsystem 930.

In the example of FIG. 9, one or more sensors 940 may be associated with the computing device. For example, if device 910 is a peripheral device for measuring blood pressure, then sensors 940 may be blood pressure monitoring sensors. However, this is optional and in some cases computing device 910 will not be associated with sensors.

Communications between the various elements of device 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a connector device, the method comprising:
   receiving a first message from a peripheral device, the first message being received over a short range communications protocol connection utilizing a generic reading and writing service attribute profile, the first message being addressed to a network element and comprising an indication that a payload size is greater than a threshold;
   sending a read command for the payload to the peripheral device;
   receiving the payload from the peripheral device;
   repackaging the payload for the network element within the first message into a second message; and
   transmitting the second message to the network element, the transmitting utilizing a second communications connection.

2. The method of claim 1 further comprising:
receiving a third message from the network element;
repackaging data within the third message into a fourth message at the connector device; and
transmitting the fourth message to the peripheral device, the transmitting utilizing the short range communications protocol connection,
wherein the repackaging data configures the attribute profile operation based on information within the third message.

3. The method of claim 1, wherein the field is a topic field in a Message Queuing Telemetry Transport protocol.

4. The method of claim 1, wherein the generic reading and writing service attribute profile includes at least one of an indications sub-procedure; a read characteristic sub-procedure; a write characteristic sub-procedure; and a notifications sub-procedure.

5. The method of claim 1, wherein the generic reading and writing service attribute profile includes at least one characteristic selected from: a Configuration characteristic; a cloud data download characteristic; a cloud data upload characteristic; and a device configuration characteristic.

6. The method of claim 1, wherein the connector is a Bluetooth Low Energy (BLE) Generic Attribute Profile (GATT) Client and the peripheral device is a BLE GATT server.

7. The method of claim 1, wherein the peripheral device is a medical peripheral device.

8. A connector device comprising:
a processor; and
a communications subsystem,
wherein the connector device is configured to:
receive a first message from a peripheral device, the first message being received over a short range communications protocol connection utilizing a generic reading and writing service attribute profile, the first message being addressed to a network element and comprising an indication that a payload size is greater than a threshold;
send a read command for the payload to the peripheral device;
receive the payload from the peripheral device;
repackage the payload for the network element within the first message into a second message; and
transmit the second message to the network element, the transmitting utilizing a second communications connection.

9. The connector device of claim 8, wherein the connector device is further configured to:
receive a third message from the network element;
repackage data within the third message into a fourth message at the connector device; and
transmit the fourth message to the peripheral device, the transmitting utilizing the short range communications protocol connection,
wherein the repackaging data configures the attribute profile operation based on information within the third message.

10. The connector device of claim 8, wherein the field is a topic field in a Message Queuing Telemetry Transport protocol.

11. The connector device of claim 8, wherein the generic reading and writing service attribute profile includes at least one of an indications sub-procedure; a read characteristic sub-procedure; a write characteristic sub-procedure; and a notifications sub-procedure.

12. The connector device of claim 8, wherein the generic reading and writing service attribute profile includes at least one characteristic selected from: a Configuration characteristic; a cloud data download characteristic; a cloud data upload characteristic; and a device configuration characteristic.

13. The connector device of claim 8, wherein the connector device is a Bluetooth Low Energy (BLE) Generic Attribute Profile (GATT) Client and the peripheral device is a BLE GATT server.

14. A non-transitory computer readable medium for storing instruction code, which, when executed by a processor of a connector device cause the connector device to:
receive a first message from a peripheral device, the first message being received over a short range communications protocol connection utilizing a generic reading and writing service attribute profile, the first message being addressed to a network element and comprising an indication that a payload size is greater than a threshold;
send a read command for the payload to the peripheral device;
receive the payload from the peripheral device;
repackage the payload for the network element within the first message into a second message; and
transmit the second message to the network element, the transmitting utilizing a second communications connection.

* * * * *